United States Patent
Frank et al.

(10) Patent No.: US 8,077,597 B1
(45) Date of Patent: Dec. 13, 2011

(54) MULTI-DWELL CHANNEL MONITORING FOR COORDINATED FREQUENCY HOPPED SYSTEMS

(75) Inventors: Robert J. Frank, Cedar Rapids, IA (US); Richard L. Robertson, Cedar Rapids, IA (US); Carlos J. Chavez, Marion, IA (US); Mark W. Barglof, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 951 days.

(21) Appl. No.: 12/074,800

(22) Filed: Mar. 6, 2008

(51) Int. Cl.
*H04J 11/00* (2006.01)
*H04B 7/216* (2006.01)

(52) U.S. Cl. .................. 370/208; 370/342; 375/132

(58) Field of Classification Search .................. None
See application file for complete search history.

(56) References Cited

U.S. PATENT DOCUMENTS

| | | | |
|---|---|---|---|
| 3,932,818 A | 1/1976 | Masak | |
| 4,612,669 A | 9/1986 | Nossen | |
| 5,414,433 A | 5/1995 | Chang | |
| 5,592,179 A | 1/1997 | Windyka | |
| 5,701,583 A | 12/1997 | Harbin et al. | |
| 5,818,386 A | 10/1998 | Belisle | |
| 5,861,845 A | 1/1999 | Lee et al. | |
| 5,898,728 A * | 4/1999 | Sentz et al. | 375/132 |
| 6,034,987 A | 3/2000 | Chennakeshu et al. | |
| 6,131,013 A | 10/2000 | Bergstrom et al. | |
| 6,320,540 B1 | 11/2001 | Meredith | |
| 6,339,399 B1 | 1/2002 | Andersson et al. | |
| 6,693,971 B1 | 2/2004 | Kowalski | |
| 7,548,578 B2 * | 6/2009 | Liu et al. | 375/133 |
| 7,653,141 B2 * | 1/2010 | Mo et al. | 375/260 |
| 7,768,987 B2 * | 8/2010 | Rahman et al. | 370/344 |

* cited by examiner

*Primary Examiner* — Steven H Nguyen
(74) *Attorney, Agent, or Firm* — Donna P. Suchy; Daniel M. Barbieri

(57) ABSTRACT

Spectral environment estimation systems and methods are provided for use with frequency hopped communications systems. A spectral sensor is configured to receive input signals from a signal aperture and to perform spectral estimations on the input signals to generate a frequency domain spectral estimate. Ordinary spectral characterization circuitry is configured to receive the frequency domain spectral estimate as an input and to produce an ordinary frequency domain spectral environment estimate based on the spectral estimate. Frequency hopping translation circuitry is configured to receive the frequency domain spectral estimate from the spectral sensor as an input and to produce a de-hopped channel domain spectral estimate based on the frequency domain spectral estimate. De-hopped spectral characterization circuitry is configured to receive the de-hopped channel domain spectral estimate as an input and to produce a de-hopped channel domain spectral environment estimate based on the de-hopped spectral estimate. Spectral environment integration circuitry is configured to generate an integrated spectral environment estimate, based on the ordinary frequency domain spectral environment estimate and the de-hopped channel domain spectral environment estimate, for use by networked communications systems or devices in controlling frequency hopped communications.

15 Claims, 4 Drawing Sheets

MULTI-DWELL CHANNEL MONITORING FOR COORDINATED FREQUENCY HOPPED SYSTEMS

BACKGROUND

Spread spectrum communication systems are becoming increasingly popular, especially as the available frequency spectrum is becoming more and more crowded with users and uses. This is true in both commercial and military applications. Spread spectrum communication systems have numerous advantages over conventional communication systems. One advantage of these systems is the signal security provided. Unlike conventional systems, it is extremely difficult to eavesdrop on communications that take place using a spread spectrum communication system.

In military and other applications, spectrum supremacy is critical to maintaining superior communications within the communication environment. This will become even more important in future communication environments. In military applications, the communication environment may include battle space between adversaries, making spectrum supremacy a critical issue.

Three steps are key to achieving supremacy. First, the available spectrum should be used to maximal efficiency across the theatre. Second, communication systems ideally should be able to adapt rapidly to threats and environmental factors effecting robustness (e.g., jamming, enemy communications, etc.). Third, robust communication techniques need to be retained while achieving efficiency. For example, hopping and other anti-jamming (AJ) and Electronic Counter Counter Measures (ECCM) features should be maintained.

Frequency hopped tactical communications systems may strive to achieve efficient spectrum utilization through network coordination of spectral resources. Using these systems, the spectral resources are rapidly assigned when a communications need arises between given nodes, and then are rapidly released as the communications need subsides. This approach makes efficient temporal reuse of spectrum and channels. These channels are not just assigned one time across the network, but are reassigned multiple times simultaneously across the network achieving geographic reuse of the frequency spectrum (e.g., like a dynamic cell phone system). The system coordinates the assignment and allocation of these resources on a high performance low latency ad hoc network based on a control network. This control network distributes what channels are used and where, and uses the information to intelligently reassign the channels to nodes out of interference range of one another.

The communication channels provided by this type of system are frequency hopped robust communication channels providing fade and jamming tolerance through constant variation in center frequency. The channels are typically, but not necessarily always, allocated in an orthogonal manner (e.g., each frequency hopped channel is non-colliding with other frequency hopped channels), and all hopped channels are assigned out of a common frequency pool. For example if the system is supplied with 16 frequencies, it will create 16 frequency hopped channels within that assignment, and will then assign these many times across the communication environment or battle space.

Thus, frequency hopped tactical communication systems may in their base format have two key elements: 1) An ad hoc network enabling requests for communication services, and responsible for sharing of control, coordination, networking, and spectral usage data; and 2) A real time reconfigurable data transport channel providing communication services on frequency hopped patterns and waveform structures negotiated on the ad hoc network channel.

The discussion above is merely provided for general background information and is not intended to be used as an aid in determining the scope of the claimed subject matter.

SUMMARY

Spectral environment estimation systems and methods are provided for use with frequency hopped communications systems. A spectral sensor is configured to receive input signals from a signal aperture and to perform spectral estimations on the input signals to generate a frequency domain spectral estimate. Ordinary spectral characterization circuitry is configured to receive the frequency domain spectral estimate as an input and to produce an ordinary frequency domain spectral environment estimate based on the spectral estimate. Frequency hopping translation circuitry is configured to receive the frequency domain spectral estimate from the spectral sensor as an input and to produce a de-hopped channel domain spectral estimate based on the frequency domain spectral estimate. De-hopped spectral characterization circuitry is configured to receive the de-hopped channel domain spectral estimate as an input and to produce a de-hopped channel domain spectral environment estimate based on the de-hopped spectral estimate. Spectral environment integration circuitry is configured to generate an integrated spectral environment estimate, based on the ordinary frequency domain spectral environment estimate and the de-hopped channel domain spectral environment estimate, for use by networked communications systems or devices in controlling frequency hopped communications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As discussed above, frequency hopped tactical communication systems in their base format may have an ad hoc network and a real time reconfigurable data transport channel providing communication services on frequency hopped patterns and waveform structures negotiated on the ad hoc network channel. Generally, the basic system does not have an independent channel monitor sensor, and only receives information about the communications channel over the ad hoc network. Disclosed embodiments utilize spectral sensors to generate spectral sensor information, and then translate the spectral sensor information into a format that is useful as feedback and observation of a hopping communications channel environment.

Spectral sensors can be very useful in characterizing static emitters such as television (TV) stations, radio stations and un-hopped communications channels. However they are limited with respect to characterization of hopped or ECCM waveform structures. In accordance with certain features of some disclosed embodiments, the problem of monitoring channel occupancy of a spectrally coordinated frequency hopping system with a spectral sensor is addressed. In some embodiments, the spectral sensor's integration time is set to times relating to system frequency dwell times, and it then performs spectral characterization in a two step process:

Characterization of static or unanticipated interference in a standard Fast Fourier Transform (FFT) sweep; and Translation of sequential spectral samples into the frequency hopped system channel space, enabling independent real time monitoring of hopped frequency occupancy (and taking advantage of multiple dwells to improve the spectral density measurement).

Applying this channel translation of sequential spectral samples into the frequency hopped system channel space can potentially enhance the performance of the frequency hopped system by providing channel analysis and an independent measure of channel usage and capacity. This can improve the robustness and performance of the frequency hopped system spectral allocation and adaptation protocols. These techniques more generally enable passive channel monitoring of frequency hopped systems with combined metrics of longer than a single dwell time. For modern data link approaches where channel pools are shared resources, this can be very important.

Figure 1:
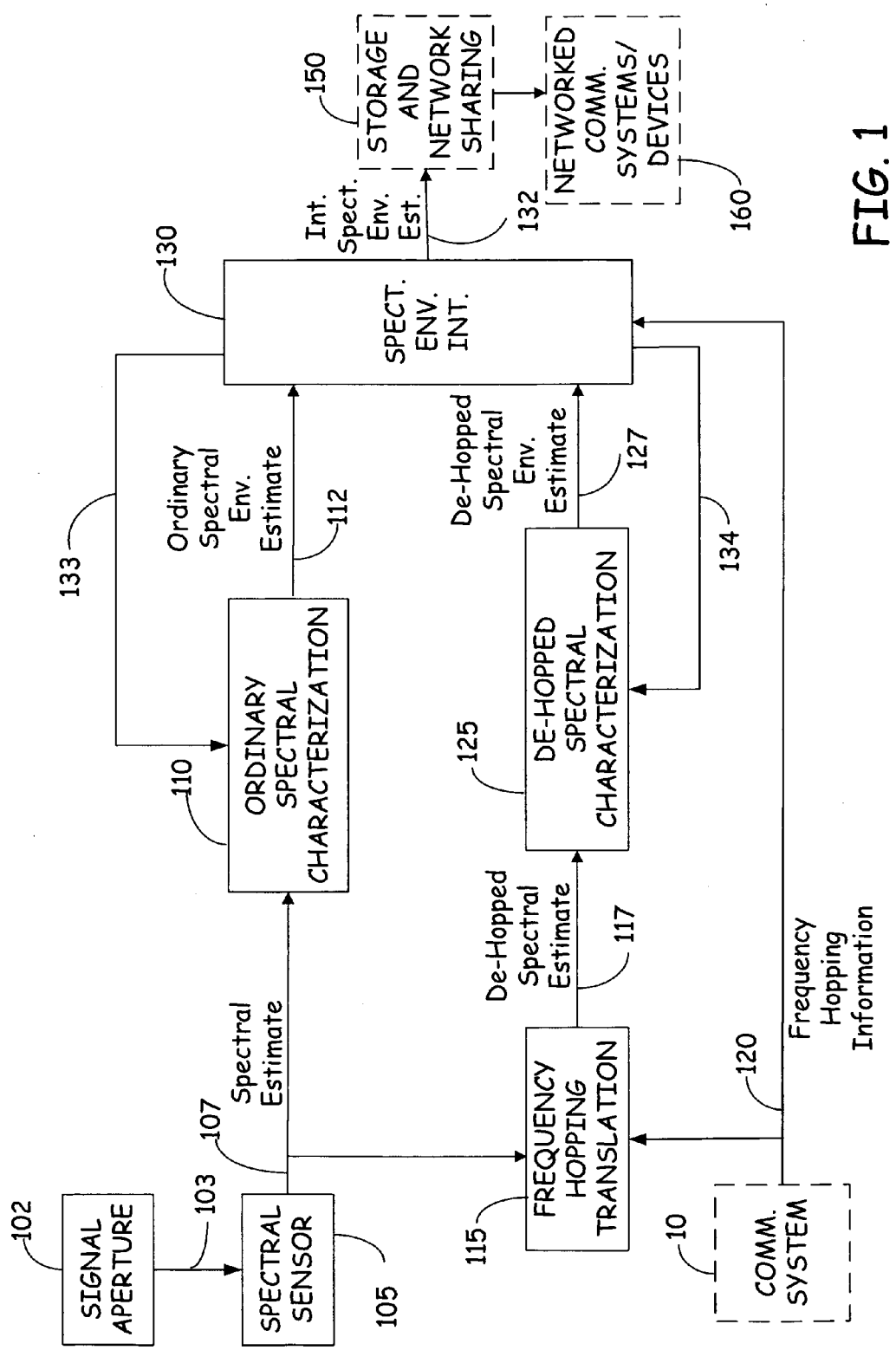
FIG. 1 is a block diagram illustrating a spectral environment estimation system for use with frequency hopped communications systems.

Referring now to FIG. 1, shown is a block diagram of a spectral environment estimation system 100 for use with or in frequency hopped communications systems, such as system 10. An antenna (or other signal aperture) 102 provides an input 103 into a spectral sensor 105 of system 100. The spectral sensor 105 performs spectral estimation on the input signal 103 to generate a frequency domain spectral estimate 107 as an output. The spectral sensor 105 can be configured to use any of a number of spectral estimation techniques (discrete Fourier transform, discrete cosine transform, wavelet transform, etc.) to generate the spectral estimate 107. The spectral estimate 107 comprises estimates for the amount of power present in each of a number of frequency bins (e.g., frequency ranges). The number of frequency bins depends on the total bandwidth observed by the spectral sensor and the integration time of the spectral estimate.

In one example embodiment, the integration time of spectral sensor 105 is set to correspond to the frequency hop rate of the communication system 10, and is synchronized with the transmission security (TRANSEC) roll over time for the hopping algorithm used by communication system 10. A spectral snapshot from each of these integration times can be used to identify environmental emitters.

System 100 also includes ordinary spectral characterization circuitry 110, coupled to spectral sensor 105 and which receives spectral estimate 107 as an input. The ordinary spectral characterization circuitry 110 is configured to use the spectral estimate to determine what signals may be present in the spectral environment. The term "ordinary" is used to distinguish from the term "de-hopped" as will be discussed below. The output of circuitry 110 is the ordinary spectral environment estimate 112, which comprises a parametric representation of all signals that have been determined to be present. The parametric representation may comprise parameters such as estimated power, bandwidth, center frequency, and time for each signal. In some embodiments, ordinary spectral characterization circuitry 110 is configured to use radiometric detection techniques to determine the presence of a particular signal. Note that spectral estimates from multiple consecutive integration times may be used to achieve better detection performance of stationary signals.

System 100 also includes frequency hopping translation circuitry 115. The spectral estimate 107 from spectral sensor 105 is also an input to frequency hopping translation circuitry 115, which is configured to use this input to produce a de-hopped spectral estimate 117 using frequency hopping information 120 from a communication system 10. Communication system 10 typically includes, or is connected to, a communication aperture and receives and transmits communication messages. In some embodiments, the communication system is responsible for network coordination of spectral allocation. Frequency hopping information 120 can include, for example, the hopping sequence used by communication system 10, or other information used by communication system 10 to generate the hopping sequence (e.g., a key, etc.). To produce de-hopped spectral estimate 117, the frequency bins of the spectral estimate 107 are rearranged in de-hopped spectral estimate 117 in such a way as to de-hop the frequency hopping channels of the communication system. The bins of the de-hopped spectral estimate 117 no longer correspond to physical frequency, but to the frequency hopping channels of the communication system. In other words, spectral estimate 117 can be considered to be in a frequency hopped channel space or domain.

System 100 also includes de-hopped spectral characterization circuitry 125. The de-hopped spectral characterization circuitry 125 accepts the de-hopped spectral estimate 117 as an input and is otherwise configured to operate in the same manner as the ordinary spectral characterization circuitry 110. The result is the de-hopped spectral environment estimate 127. Note that spectral estimates from multiple consecutive integration times may be used to achieve better detection performance of signals that use the frequency hopping channels translated by the frequency hopping translation circuitry 115. These signals will appear to be stationary in the de-hopped spectral estimate 117 and the de-hopped spectral environment estimate 127.

Figure 2:
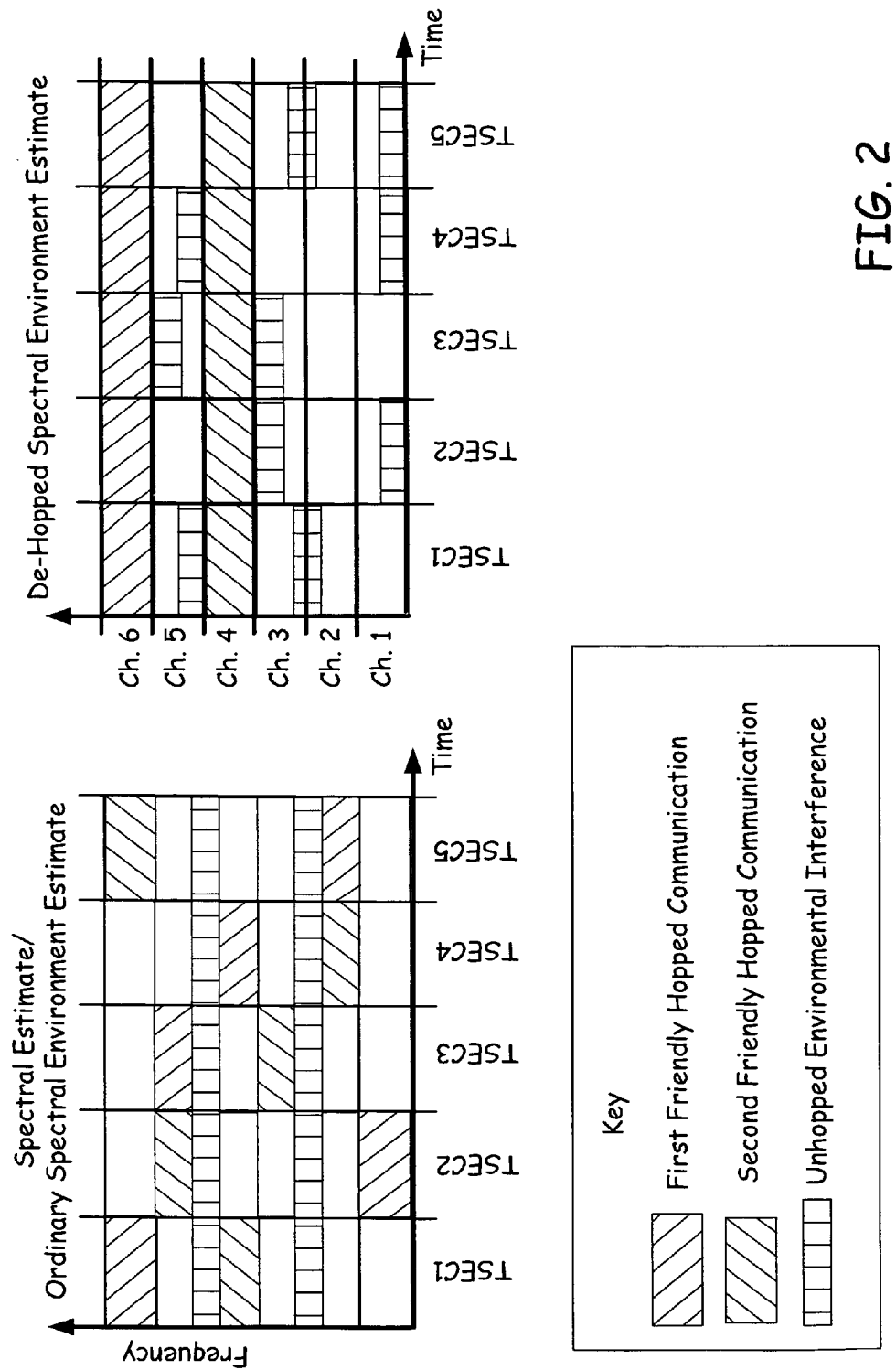
FIG. 2 is a diagrammatic representation of certain parametric information in a frequency space and in a frequency hopped channel space.

Referring for the moment to FIG. 2, shown is a diagrammatic representation of some of the parametric information discussed above. On the left hand side of FIG. 2, the diagram illustrates the presence of received power over the frequency range corresponding to a number of frequency bins at each of five consecutive time intervals (TSEC1 through TSEC5). As seen in the key provided, the received power corresponds in this example to first and second friendly hopped communications, or to unhopped environmental interference (e.g., television stations, radio stations, jamming signals, etc.). This diagram is representative of some of the information available in either or both of spectral estimate 107 and ordinary spectral environmental estimate 112. The information of spectral estimate 107 or the parametric information of ordinary spectral environmental estimate 112 is not limited to the illustrated information, but instead can include the types of information discussed above. FIG. 2 merely provides an illustration of the nature of received/detected power in an environment having both constant frequency interference and hopped communication signals.

On the right hand side of FIG. 2, the diagram illustrates the presence of received power on six example frequency hopped communication channels (Ch. 1 through Ch. 6) using the same frequency range as that shown on the left hand side of FIG. 2. In other words, the diagram on the right hand side of FIG. 2 represents the frequency bins at each of five consecutive time intervals (TSEC1 through TSEC5), but in a de-hopped format so that frequency bins at various frequencies of the same communication channel are positioned next to one another. In other words, this spectral estimate is represented in the frequency hopped channel space, instead of the frequency domain, in order to better characterize frequency hopped communication signals. This diagram is representative of some of the information available in either or both of de-hopped spectral estimate 117 and de-hopped spectral environmental estimate 122. The information of de-hopped spectral estimate 117 or the parametric information of de-hopped spectral environmental estimate 127 is not limited to the illustrated information, but instead can include the types of information discussed above. In an example embodiment, the parametric representation of signals in the frequency hopped channel space includes estimated power, frequency hopped channel, and time for each signal.

De-hopped spectral characterization circuitry 125 supplies, in de-hopped spectral environment estimate 127, information which is used (by spectral environment integration circuitry 130 discussed below) to analyze coordinated channel usage. It supplies independent channel measurements which provide refinement and additional robustness to the network channel usage picture. This allows integration and averaging of traffic statistics on a channel by channel basis for as many dwell times as is desired. It is also possible to see if interference is occurring in a manner correlated to any of the communications channels such as a follower jammer.

System 100 also includes spectral environment integration circuitry 130 coupled to each of ordinary spectral characterization circuitry 110 and de-hopped spectral characterization circuitry 125, and receiving as inputs ordinary spectral environment estimate 112, de-hopped spectral environment estimate 127 and frequency hopping information 120. The spectral environment integration circuitry 130 accepts the ordinary and de-hopped spectral environment estimates, and using these inputs as well as the frequency hopping information, generates or obtains an integrated spectral environment estimate 132. In some embodiments, the integrated spectral environment estimate 132 is a parametric representation of both all signals present in the frequency domain (e.g., including static frequency emitters) and of communications on the monitored frequency hopped communications channels. Spectral environment integration circuitry 130 can also be configured to generate the integrated spectral environment estimate 132 by translating the de-hopped spectral environment estimate 127 back into physical frequencies and combining this information with the ordinary spectral environment estimate. Furthermore, feedback shown at 133 and 134 in FIG. 1 can be provided to both spectral characterization circuits 110 and 125, allowing either circuit to compensate for the presence of signals detected by the other circuit. For example, using feedback 134, identified environmental emitters (e.g., televisions stations, radio stations, jamming signals, etc) identified using ordinary spectral environment estimate 112 can be excluded by circuitry 125 from consideration as pertaining to frequency hopped signals. Similarly, using feedback 133, identified frequency hopped signals identified using de-hopped spectral environment estimate 127 can be excluded by circuitry 110 from consideration as pertaining to an environmental emitter. This can improve the detection performance of both characterization circuits 110 and 125.

The spectral environment integration circuitry 130 is responsible for locally interpreting and sharing two types of information over the network (represented by storage and network sharing block 150). These two types of shared information include the environmental picture and coordinated communications channel usage. In addition to network sharing of this information with networked communications systems and/or devices 160 (e.g., such as communications system 10), block 150 represents a computer readable or storage medium and storage of estimate 132 for use by networked communications systems and devices 160 in controlling frequency hopped communications to optimize channel usage, minimize interference from jammers and other emitters, etc.

Figure 3:
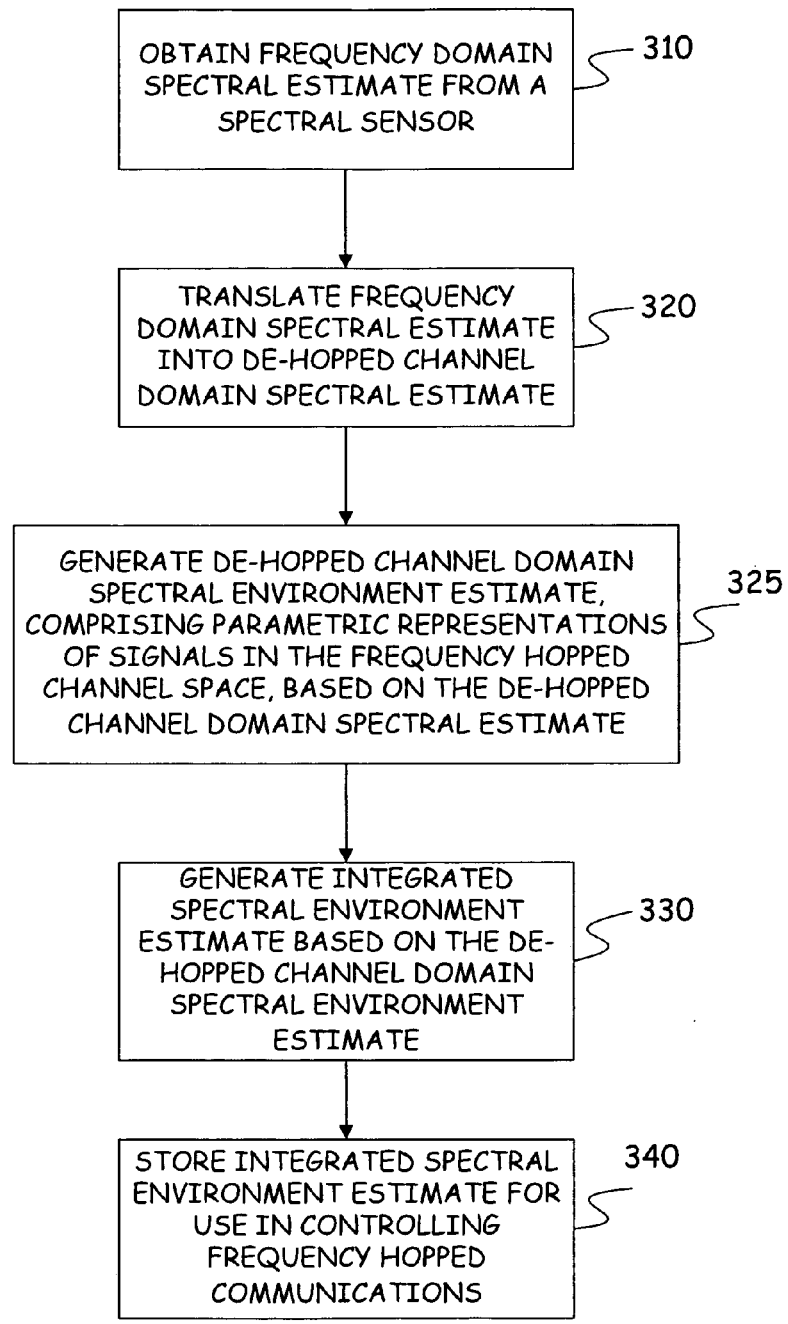
FIGS. 3 and 4 are flow diagrams illustrating method embodiments.

Aspects of disclosed embodiments described above with reference to a spectral environment estimation system can also be implemented as processes or methods of generating spectral estimates for use in controlling frequency hopped communications. For example referring first to FIG. 3, shown is a flow diagram illustrating a first method embodiment. As shown in FIG. 3, the first method embodiment includes the step 310 of obtaining a frequency domain spectral estimate from a spectral sensor monitoring a frequency range. Then, at step 320, the frequency domain spectral estimate is translated into a de-hopped channel domain spectral estimate as described above.

Figure 4:
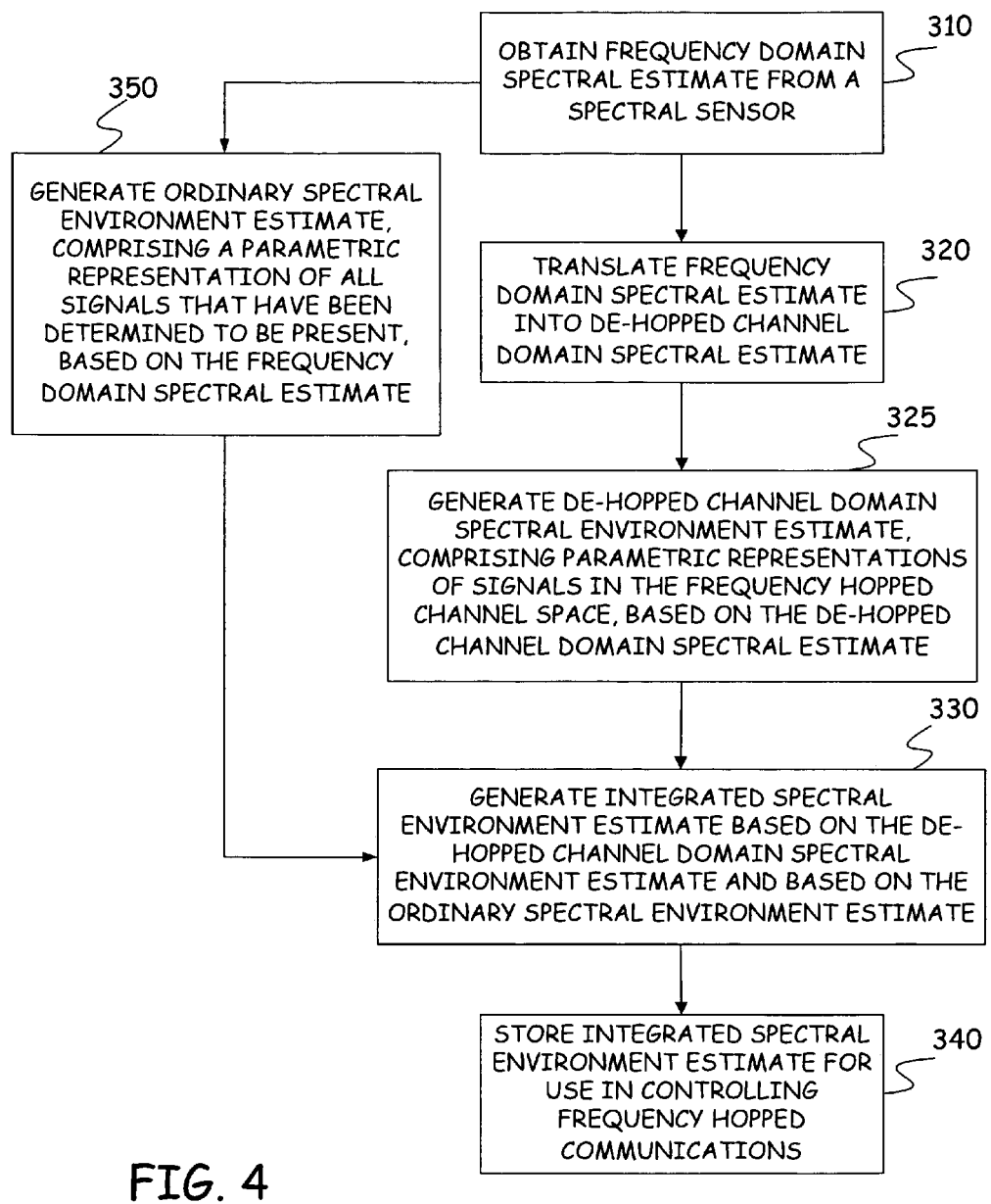

At step 325, a de-hopped channel domain spectral environment estimate, comprising parametric representations of signals in the frequency hopped channel space, is generated based on the de-hopped channel domain spectral estimate. At step 330, a spectral environment estimate is generated based on the de-hopped channel domain spectral estimate. In some embodiments, the spectral environment estimate is an integrated spectral environment estimate, which can take a number of different forms. For example, the integrated spectral environment estimate can be the de-hopped channel domain spectral environment estimate 127, but translated back from the frequency hopped channel domain or space into the frequency domain or space. In other embodiments as discussed with reference to FIG. 4, the integrated spectral environment estimate corresponds to a combination of both the de-hopped spectral environment estimate 127 and the ordinary spectral environment estimate 112. Either of these types of spectral environment estimates can be referred to a integrated spectral environment estimates. Then, at step 340, the method includes storing the spectral environment estimate in a tangible computer readable or computer storage medium (e.g., random access memory, flash memory, hard disk drive memory, etc.) for use in controlling frequency hopped communications using a frequency hopped communication system. Any or all of these steps can be implemented using processing circuitry, whether comprising discrete components or suitably programmed or configured processing circuitry, as described with reference to FIG. 1.

As described above with reference to FIGS. 1 and 3, the integrated spectral environment estimate can also be generated based on an ordinary spectral environment estimate such as the one provided by circuitry 110. Thus, in another method embodiment shown in FIG. 4, the method includes the step 350 of generating an ordinary spectral environment estimate, comprising a parametric representation of all signals that have been determined to be present, based on the frequency domain spectral estimate. In this embodiment, the step 330 of generating the integrated spectral environment estimate comprises generating the integrated spectral environment estimate based on the de-hopped channel domain spectral environment estimate and based on the ordinary spectral environment estimate. In each of these embodiments, the various features described above (e.g., parametric representations, use of frequency hopping information, etc) can also be employed in implementing the method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the circuitry shown in FIG. 1 can be implemented using suitably programmed processing circuitry instead of discrete analog and digital components, and references to the circuitry should be understood to include both discrete component circuitry implementations, programmed processor circuitry implementations, and combinations of the two. Other examples of modifications of the disclosed concepts are also possible, without departing from the scope of the disclosed concepts.

What is claimed is:

1. A spectral environment estimation system for use with frequency hopped communications systems, comprising:
   a spectral sensor configured to receive input signals from a signal aperture and to perform spectral estimations on the input signals to generate a frequency domain spectral estimate as an output;
   frequency hopping translation circuitry configured to receive the frequency domain spectral estimate from the spectral sensor as an input and to produce a de-hopped channel domain spectral estimate based on the frequency domain spectral estimate;
   de-hopped spectral characterization circuitry configured to receive the de-hopped channel domain spectral estimate as an input and to produce a de-hopped channel domain spectral environment estimate based on the de-hopped spectral estimate, wherein the de-hopped channel domain spectral environment estimate is a parametric representation of signals in a frequency hopped channel space; and
   spectral environment integration circuitry configured to generate an integrated spectral environment estimate, based on the de-hopped channel domain spectral environment estimate, for use by networked communications systems or devices in controlling frequency hopped communications.

2. The spectral environment estimation system of claim 1, and further comprising:
   ordinary spectral characterization circuitry configured to receive the frequency domain spectral estimate from the spectral sensor as an input and to produce an ordinary spectral environment estimate based on the frequency domain spectral estimate, wherein the ordinary spectral environment estimate comprises a parametric representation of all signals that have been determined to be present;
   wherein the spectral environment integration circuitry is further configured to generate the integrated spectral environment estimate based on a combination of the de-hopped channel domain spectral environment estimate and the ordinary spectral environment estimate.

3. The spectral environment estimation system of claim 2, wherein the spectral environment integration circuitry is further configured to provide feedback to each of the de-hopped spectral characterization circuitry and the ordinary spectral characterization circuitry, allowing each of the de-hopped spectral characterization circuitry and the ordinary spectral characterization circuitry to compensate for the presence of signals detected by the other of the de-hopped spectral characterization circuitry and the ordinary spectral characterization circuitry.

4. The spectral environment estimation system of claim 2, wherein parametric representations in the ordinary spectral environment estimate comprise estimated power, bandwidth, center frequency and time for each signal present.

5. The spectral environment estimation system of claim 1, wherein the frequency hopping translation circuitry also receives as an input frequency hopping information for a networked communication system, and wherein the frequency hopping translation circuitry is further configured to produce the de-hopped channel domain spectral estimate based on the frequency hopping information.

6. The spectral environment estimation system of claim 1, wherein the parametric representation of signals in the frequency hopped channel space comprises estimated power, frequency hopped channel, and time for each signal.

7. The spectral environment estimation system of claim 1, and further comprising a non-transitory computer-readable medium on which the integrated spectral environment estimate is stored for use by the networked communications systems or devices in controlling frequency hopped communications.

8. The environment estimation system of claim 1, wherein the spectral environment integration circuitry is further configured to generate the integrated spectral environment estimate such that the integrated spectral environment estimate is representative of detected constant frequency environmental emitters.

9. The environment estimation system of claim 8, wherein the spectral environment integration circuitry is further configured to generate the integrated spectral environment estimate such that the integrated spectral environment estimate is also representative of detected frequency hopped channel communications.

10. The environment estimation system of claim 9, wherein the spectral environment integration circuitry is further configured to generate the integrated spectral environment estimate such that the integrated spectral environment estimate is also representative of frequency following jamming signals.

11. A method of generating an integrated spectral estimate for use in controlling frequency hopped communications, the method comprising:
   obtaining a frequency domain spectral estimate from a spectral sensor monitoring a frequency range;
   translating the frequency domain spectral estimate into a de-hopped channel domain spectral estimate using a first processing circuitry;
   generating a de-hopped channel domain spectral environment estimate, comprising parametric representations of signals in the frequency hopped channel space, based on the de-hopped channel domain spectral estimate;
   generating an integrated spectral environment estimate based on the de-hopped-channel domain spectral environment estimate using a second processing circuitry; and
   storing the integrated spectral environment estimate on a non-transitory computer-readable medium for use in controlling frequency hopped communications using a frequency hopped communication system.

12. The method of claim 11, and further comprising:
   generating an ordinary spectral environment estimate, comprising a parametric representation of all signals that have been determined to be present, based on the frequency domain spectral estimate;
   wherein generating the integrated spectral environment estimate comprises generating the integrated spectral environment estimate based on the de-hopped channel domain spectral environment estimate and based on the ordinary spectral environment estimate.

13. The method of claim 12, wherein parametric representations in the ordinary spectral environment estimate includes estimated power, bandwidth, center frequency and time for each signal present.

14. The method of claim 13, wherein the parametric representation of signals in the frequency hopped channel space includes estimated power, frequency hopped channel, and time for each signal.

15. The method of claim 11, wherein translating the frequency domain spectral estimate into a de-hopped channel domain spectral estimate further comprises translating the frequency domain spectral estimate into the de-hopped channel domain spectral estimate based on frequency hopping information from a networked communication system.

* * * * *